United States Patent [19]

Zinn

[11] 4,353,352
[45] Oct. 12, 1982

[54] SOLAR THERMOSYPHON WATER HEATER

[75] Inventor: Michael F. Zinn, Ellenville, N.Y.

[73] Assignee: Bio-Energy Systems, Inc., Ellenville, N.Y.

[21] Appl. No.: 200,262

[22] Filed: Oct. 23, 1980

[51] Int. Cl.³ .............................................. F24J 3/02
[52] U.S. Cl. .................................... 126/426; 126/434; 126/437; 126/448; 203/DIG. 1
[58] Field of Search ............... 126/417, 426, 450, 437, 126/448, 434; 203/DIG. 1

[56] References Cited

U.S. PATENT DOCUMENTS

| | | | |
|---|---|---|---|
| 2,122,821 | 7/1938 | Mohr | 126/434 |
| 2,405,118 | 8/1946 | Delano et al. | 126/426 X |
| 4,036,209 | 7/1977 | Press | 126/426 |
| 4,060,070 | 11/1977 | Harter | 126/426 X |
| 4,084,578 | 4/1978 | Ishibashi | 126/437 X |
| 4,165,735 | 8/1979 | Smith | 126/437 |
| 4,176,654 | 12/1979 | Zinn et al. | 126/448 |
| 4,237,866 | 12/1980 | Rush | 126/434 X |

FOREIGN PATENT DOCUMENTS 2626182 12/1977 Fed. Rep. of Germany ...... 126/426

Primary Examiner—Larry Jones
Attorney, Agent, or Firm—Charles J. Brown

[57] ABSTRACT

A solar thermosyphon water heater assembly wherein an inlet manifold and an outlet manifold which also serves as a storage tank are connected by a solar heat absorber comprising flexible rubber tube strips each formed of multiple tubes connected by separable webs, whereby prior to installation the strips can be rolled up about the storage tank or inlet manifold.

6 Claims, 6 Drawing Figures

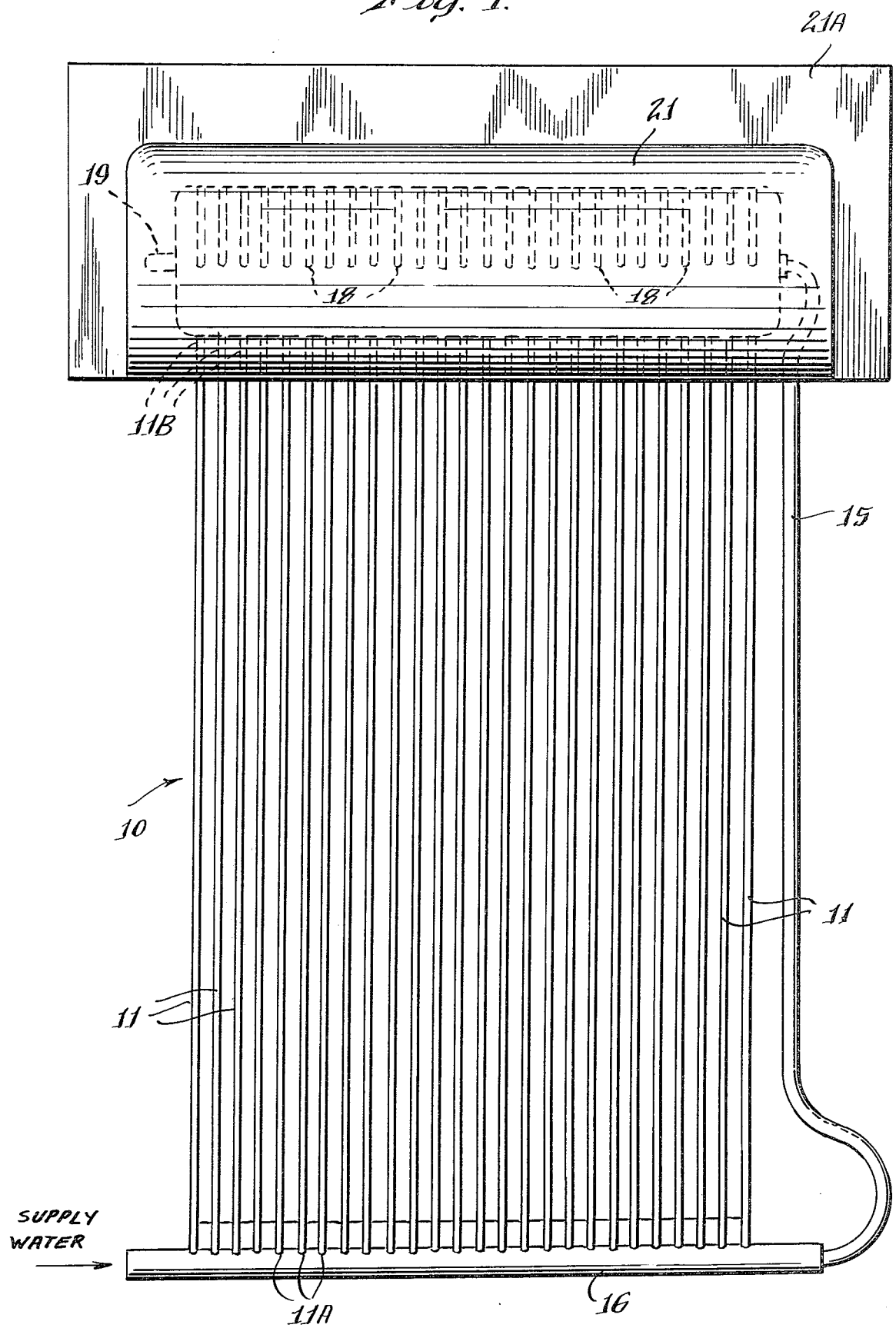

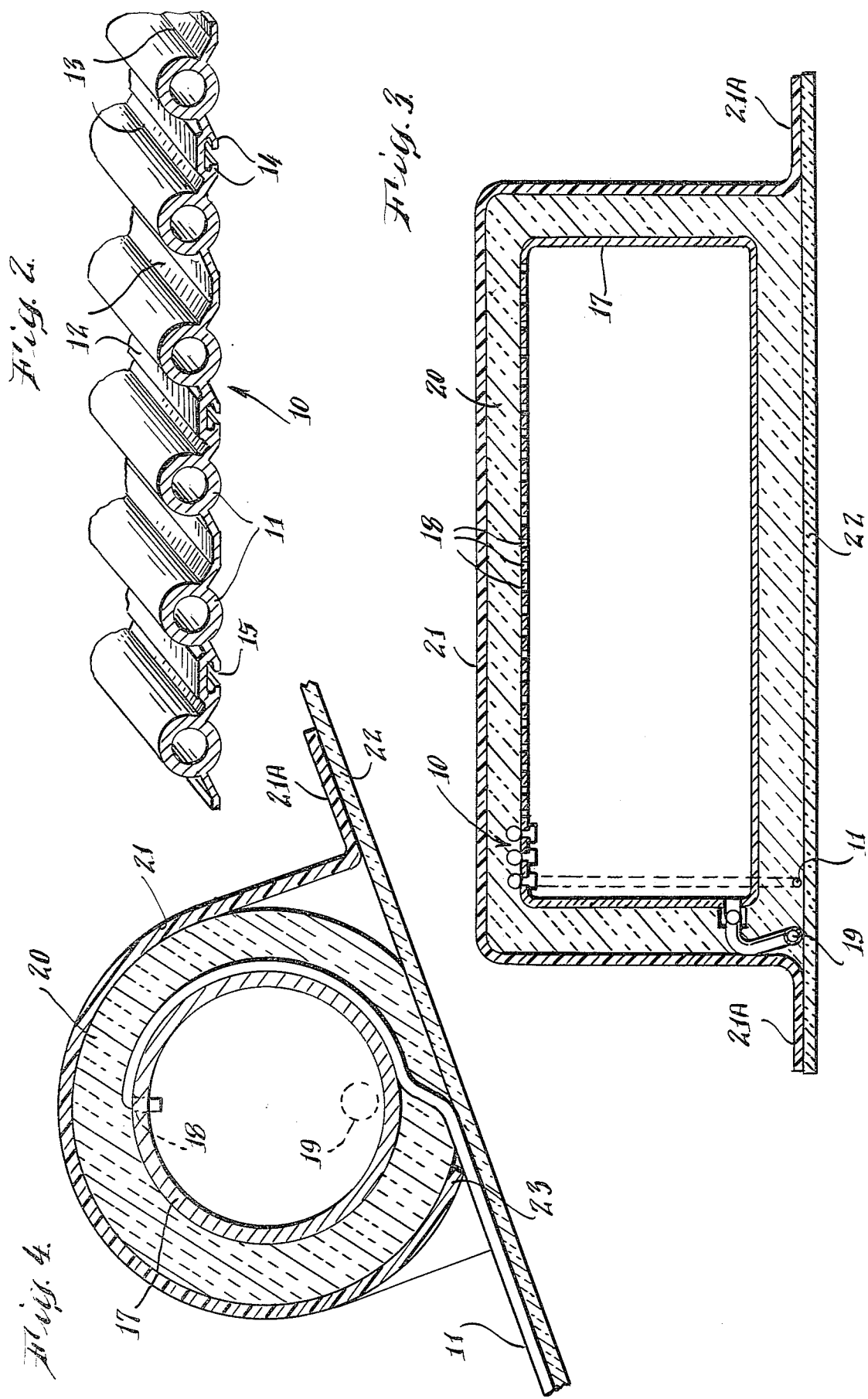

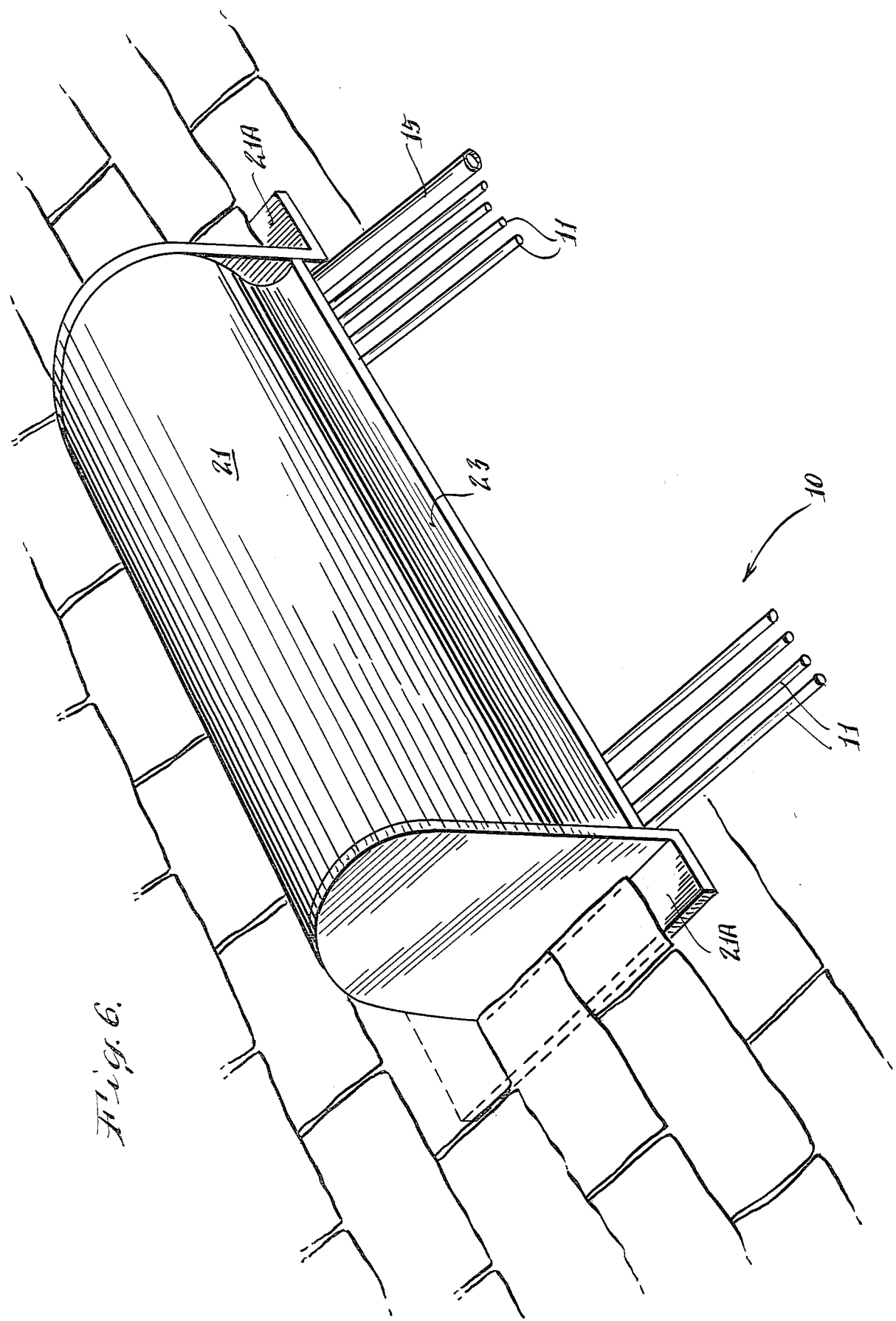

SOLAR THERMOSYPHON WATER HEATER

BACKGROUND OF THE INVENTION

It is well known to utilize solar energy for purposes of heating water in a system which relies upon the tendency of water to stratify according to temperature so as to achieve natural circulation. Natural circulation solar water heaters of the prior art employ a rigid solar absorber surface consisting of a plurality of fluid conducting passages arranged in a plane disposed toward the sun and connected by inlet and outlet manifolds, the latter elevated above the former. A storage tank is suspended near or above the upper or outlet manifold to provide a reservoir into which the heated water rises. Cold water is introduced into the lower or inlet manifold rises through the system as it is warmed in the absorber and the warmed water is withdrawn from the storage tank on demand. A return pipe circulates the water from the upper to the lower manifold. Rigid tubes are commonly employed for the absorber, as well as highly wetted rigid plastic with numerous closely spaced conducting channels. In any event the typical prior art rigid absorber is relatively heavy and bulky and is difficult to handle during shipment and storage.

It is the principal object of the present invention to provide a solar water heater which operates on the principle of natural circulation but which has none of the disadvantages of inefficient space utilization characterizing prior art assemblies.

STATEMENT OF THE INVENTION

A solar thermosyphon water heater assembly in accordance with the present invention is adapted to be rolled up upon itself prior to installation. It comprises an inlet manifold into which supply water can be introduced. A solar absorber is included consisting of at least one extended flexible elastomeric tube strip comprising a plurality of tubes alternating with interconnecting separable webs, all of the absorber tubes being connectable in parallel to the inlet manifold. A storage tank and outlet manifold is provided of substantially larger volume than the inlet manifold from which heated water can be withdrawn, and all of the absorber tubes are connectable in parallel to this storage tank. A return pipe is included for connecting the storage tank and inlet manifold to form a closed-loop therebetween through the absorber. In a preferred form of the invention thermal insulation surrounds the storage tank and a rigid housing is disposed over the insulated tank.

The principal advantage of an assembly constructed in accordance with the invention is that the flexible solar absorber can be wrapped around the storage tank-inlet manifold during shipment and storage. All of the necessary components of the natural circulation solar water heater are therefore included in a light and compact rolled-up unit which can be efficiently stored and handled and easily unrolled at the construction site.

BRIEF DESCRIPTION OF THE DRAWINGS

FIG. 1 is a plan view of the assembly of the invention rolled out in its operating configuration;

FIG. 2 is an enlarged pictorial fragmentary section of one tube strip of the solar absorber;

FIG. 3 is a longitudinal section taken through the storage tank or outlet manifold of the assembly;

FIG. 4 is a lateral section taken through the storage tank or outlet manifold of the assembly;

FIG. 6 is a pictorial view of the storage tank and upper end of the assembly installed on a roof.

DESCRIPTION OF PREFERRED EMBODIMENT

Figure 5:
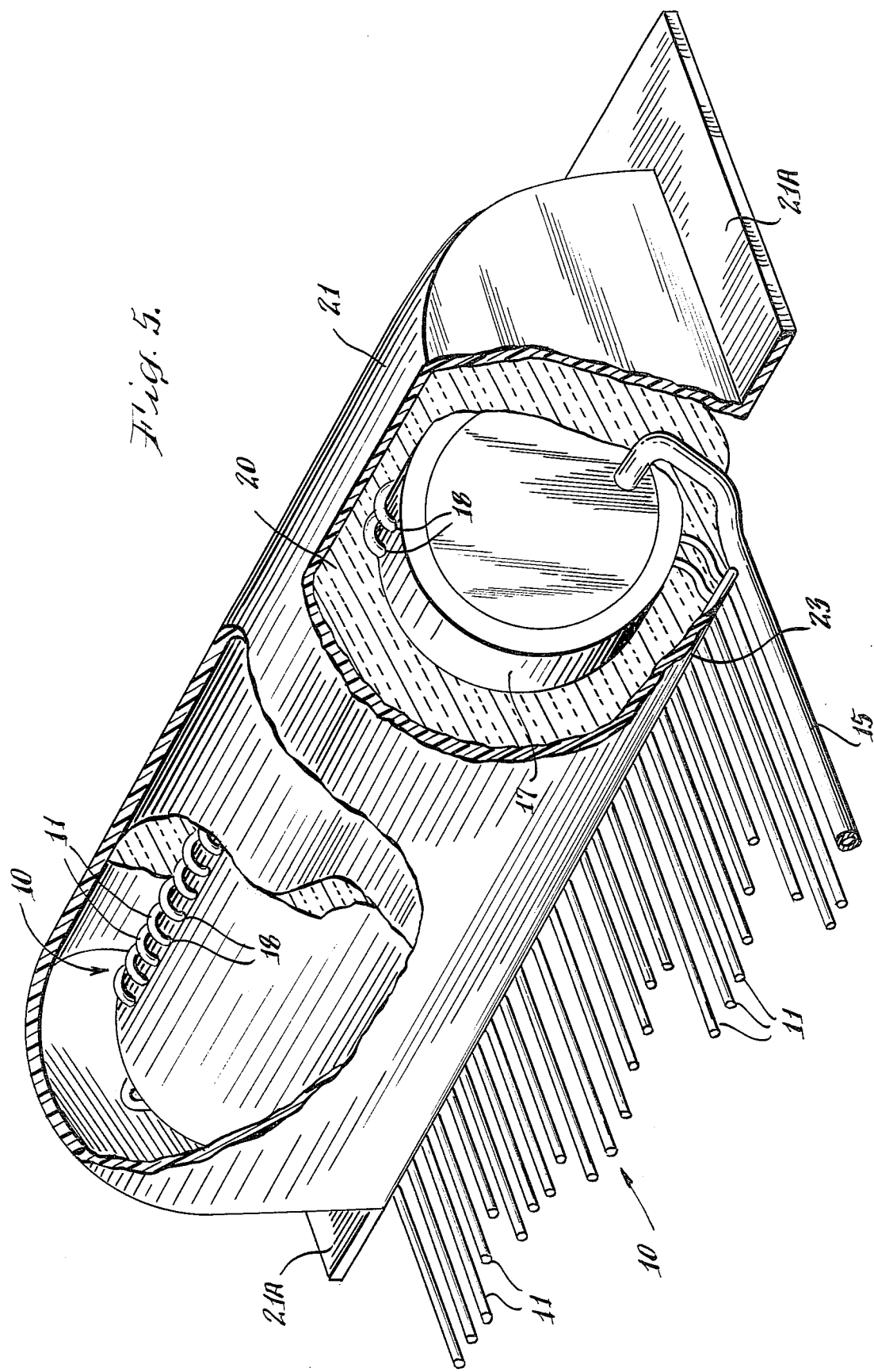
FIG. 5 is a pictorial view partly in section of the storage tank and upper end of the assembly.

Referring first to FIGS. 1 and 2, a plurality of tube strips 10 are arranged side-by-side to form an extended flexible solar absorber surface perhaps two feet wide and ten feet long. Each of the strips comprises an EPDM or other flexible elastomeric extrusion as described in my U.S. Pat. No. 4,176,657. In each strip a plurality of tubes 11 alternates with interconnecting webs 12, which are separated from the tubes 11 along tear lines 13. All of the tubes 11 are freed of their webs 12 at opposite ends 11A and 11B as shown in FIG. 1. The underside of each strip may have a plurality of deflectable projections 14 which define a plurality of inwardly diverging recesses 15, and the strip may be affixed to a base by a layer of mastic which penetrates the recesses 15 to grip the strip in a releaseable fashion.

An inlet manifold 16 is provided at one end of the assembly and all of the absorber tubes 11 are connected in parallel thereto through spaced holes in the inlet manifold wall. The inlet manifold may be a plastic pipe preferably of rigid material. A particularly advantageous form of insert connecting means may be employed between the tubes 11 and the inlet manifold 16 as described in my co-pending application Ser. No. 17,728 filed Mar. 5, 1979. Relatively cold supply water can be introduced into one end of the inlet manifold 16 as shown in FIG. 1.

At the opposite end of the solar absorber the tubes 11 thereof are similarly connected to a rigid outlet manifold of considerably larger volume than the inlet manifold 16 and which therefore serves as a storage tank 17. Longitudinally spaced holes 18 in the storage tank 17 permit the respective tubes 11 of the solar absorber to communicate with the interior of the tank, preferably using the insert type connection referred to above. When installed, the holes 18 are at the uppermost portion of the tank 17 as shown in FIG. 4. At one end of the storage tank 17 near the cylindrical wall thereof a return pipe 18 leads to the end of the inlet manifold 16 opposite the end where supply water is introduced. The return pipe 18 may be of plastic and may be flexible or rigid.

When the assembly is installed the connection between the return pipe 18 and the storage tank 17 is at a relatively low elevation in the storage tank as shown in FIG. 4. Warmed water is withdrawn from the storage tank 17 through an outlet pipe 19 at the end of the tank opposite to and higher than the return pipe 18. In accordance with known principles of natural circulation, the fresh cold water introduced from a supply into the inlet manifold 16 circulates upwardly through the absorber tube strips 10 and stratifies within the storage tank 17. The cooler water at the bottom of the storage tank 17 returns by a thermosyphon effect through the pipe 18 to the inlet manifold 16 for continued closed-loop circulation, and the warmed water which is a product of the system is withdrawn from the upper level of the storage tank 17 through the outlet pipe 19. A glazed enclosure may be installed over the solar absorber to create a greenhouse effect and increase the water temperature of the system. To maintain the characteristic flexibility of the assembly the glazing may be a film laid over the absorber prior to installation, or the glazing may be in a separate rigid housing which is not part of the assembly of the invention. In accordance with the invention the storage tank 17 is surrounded by insulation 20 such as glass fiber batt of two inch medium density. This insulation is cut to conform to the dimensions of the tank 17 and covers the tank at its ends as well around its cylindrical wall. A rigid preformed plastic enclosure 21 is placed over the tank and around the insulation 20 and has an open underside which faces an underlying insulation board 22 as shown in FIG. 4. A perimeter flange 21A may extend outwardly from the base of the enclosure 21 for mounting the unit on a roof surface as shown in FIG. 6. The flange is fitted in overlapped relation with respect to the shingles of the roof so that the assembly readily sheds water, and conventional flashing may be employed if necessary. the lowest edge 23 of the enclosure 21 is slightly higher than the other edges to allow entry of the absorber tubes 11 as shown in FIG. 4. A foam strip may be applied beneath this lower edge around the lower tubes to seal the opening.

The water heater unit of the invention is manufactured with the inlet manifold 16 and enclosed storage tank 17 connected to the tube strips 10 but without the return pipe 18 attached. As a result the flexible absorber formed by the tube strips 10 can be wrapped around the enclosure 21 together with the inlet manifold 16 to form a compact and light rolled-up unit which is readily stored and shipped. The absorber is unrolled at the contruction site and secured to the roofs or underlying insulation board 22 by mastic. The storage tank is mounted by means of the flange 21A on its enclosure 21 and the return pipe 18 is connected as described. A foam strip is put in place to seal the opening under the edge 23 of the enclosure.

An assembly in accordance with the foregoing design is lighter is weight and lower in cost than the rigid absorber units of the prior art but most importantly is much more efficient in utilization of space for shipping and storage.

The scope of the invention is set forth in the following claims rather than in the foregoing description of the preferred embodiment.

I claim:

1. A solar thermosyphon water heater assembly adapted to be rolled up upon itself prior to installation comprising
   (a) an inlet manifold into which supply water can be introduced;
   (b) a solar absorber comprising at least one extended flexible elastomeric tube strip comprising a plurality of tubes alternating with interconnecting separable webs, all of the absorber tubes being connectable in parallel to the inlet manifold;
   (c) a storage tank serving as an outlet manifold of substantially larger volume than the inlet manifold from which heated water can be withdrawn, all of the absorber tubes being connected in parallel directly to said storage tank; and
   (d) a return pipe for connecting the storage tank and inlet manifold to form a closed-loop therebetween through the absorber.

2. A solar thermosyphon water heater assembly according to claim 1 wherein thermal insulation surrounds said storage tank.

3. A solar thermosyphon water heater assembly according to claim 2 wherein a rigid housing is disposed over the insulated storage tank.

4. A solar thermosyphon water heater assembly adapted to be rolled up upon itself prior to installation comprising
   (a) a tubular inlet manifold into one end of which supply water can be introduced and having longitudinally spaced holes in the wall thereof;
   (b) a solar absorber comprising a plurality of extended parallel flexible elastomeric tube strips each comprising a plurality of tubes alternating with interconnecting webs which are separable from the tubes along tear lines, all of the absorber tubes being freed of their webs at a first end of the strips and connected in parallel to the inlet manifold through the spaced holes in the inlet manifold wall;
   (c) a rigid tubular storage tank serving as an outlet manifold of substantially larger volume than the inlet manifold and having longitudinally spaced holes in the wall thereof, all of the absorber tubes being freed of the webs at the end of the strips opposite said first end and connected in parallel directly to the storage tank through the spaced holes in the storage tank wall;
   (d) means for withdrawing water from one end of the storage tank;
   (e) thermal insulation surrounding said storage tank;
   (f) a rigid housing disposed over the insulated storage tank and adapted to be mounted on a base; and
   (g) a return pipe for connecting the storage tank to that end of the inlet manifold opposite the end into which supply water can be introduced to form a closed-loop therebetween through the absorber.

5. A solar thermosyphon water heater assembly according to claim 4 which includes an insulation board underlying said solar absorber.

6. A solar thermosyphon water heater assembly according to claim 4 wherein said solar absorber is affixed to said insulation board by mastic.

* * * * *